G. H. Smith.
Saw Guide and Jointer.
Nº 90,791. Patented Jun. 1, 1869.
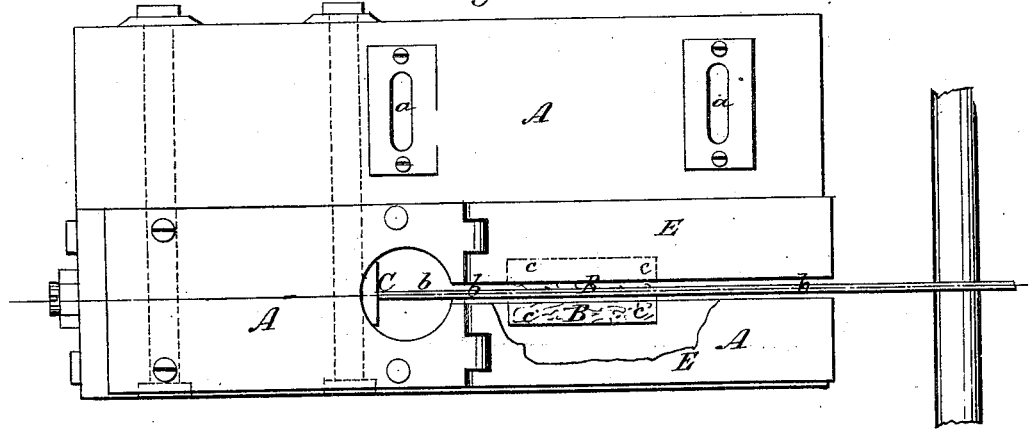
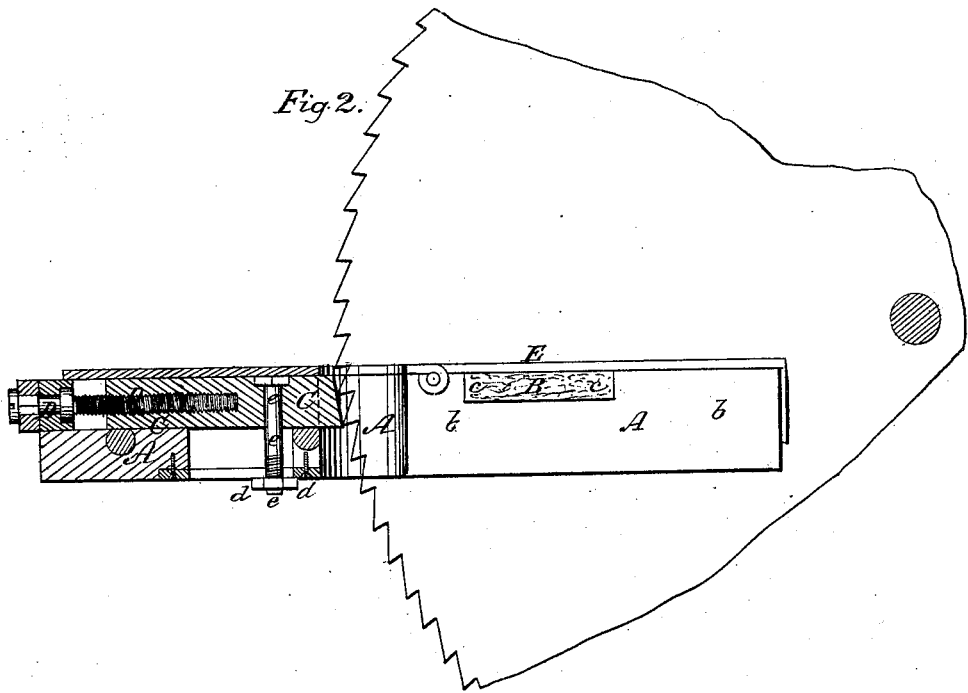
Witnesses
Wm A. Morgan.
G. C. Cotton.
Inventor.
G. A. Smith
per Munn & C.
Attys

United States Patent Office.

GARNER A. SMITH, OF BLEEKER, NEW YORK.

Letters Patent No. 90,791, dated June 1, 1869.

IMPROVEMENT IN SAW-GUIDE AND JOINTER.

The Schedule referred to in these Letters Patent and making part of the same.

*To all whom it may concern:*

Be it known that I, GARNER A. SMITH, of Bleeker, in the county of Fulton, and State of New York, have invented a new and improved Combined Guide and Jointer for Circular Saws; and I do hereby declare that the following is a full, clear, and exact description thereof, which will enable others skilled in the art to make and use the same, reference being had to the accompanying drawings, forming part of this specification.

Figure 1 represents a plan, or top view of my improved combined guide and jointer for circular saws.

Figure 2 is a vertical longitudinal section of the same, taken on the plane of the line $x-x$, fig. 1.

Similar letters of reference indicate corresponding parts.

This invention relates to a new guide for saws, which is also provided with a device for jointing, or trueing the teeth of the same.

The invention consists in arranging an adjustable tool in the slotted guide-block, which tool, when moved toward the saw, and clamped in the proper position, serves to true, or joint the teeth of the saw, thus doing away with the tedious and inaccurate process of filing, which was heretofore used for that purpose.

A, in the drawing, represents a block, or plank, of suitable size and shape, made of wood, or other suitable material.

This plank is secured, by means of suitable bolts, to the saw-frame, said bolts passing through slots $a\ a$, that are formed through the plank, so that the latter is adjustable on the frame, to bring its slot $b$ in line with the saw.

The saw works in the slot $b$, as indicated in figs. 1 and 2. On each side of the slot is arranged, in the plank, a recess, $c$, which serves to retain some hemp, or other packing-material, B, as shown in fig. 1.

This packing-material is saturated with oil, or other suitable liquid, or other material, and serves to moisten and cool the saw near its edge. The packing-strips B are held in position by means of plates E, hinged to the plank A, as shown, and can, by raising these lids E, be easily removed and replaced.

The end of the slot $b$ is formed by an adjustable tool, C, which can be moved toward or away from the saw by means of a screw, D, shown in fig. 2, and which can be clamped in any desired position by means of a nut, $d$, screwed upon a pin, $e$, that projects from the tool C, through a slot in the plank, as is clearly shown in fig. 2.

When the saw is in operation, the tool C is, by turning the screw D, drawn away from it, so as not to come in contact with its edge. When the teeth of the saw are to be trued, or jointed, after having become somewhat worn by use, the tool C is fed against the edge of the teeth, as shown in fig. 2, and when then the saw is turned, its teeth will all be jointed and resharpened.

What I claim as my invention, and desire to secure by Letters Patent, is—

The saw-guide and jointer herein described, when all the parts are constructed, arranged, and operated as shown.

GARNER A. SMITH.

Witnesses:
JAMES H. SPRINKS,
ALEX. F. ROBERTS.